(12) United States Patent
Bonk et al.

(10) Patent No.: US 12,466,296 B2
(45) Date of Patent: Nov. 11, 2025

(54) VEHICLE AND OCCUPANT SUPPORT FOR A VEHICLE

(71) Applicant: Faurecia Automotive Seating, LLC, Auburn Hills, MI (US)

(72) Inventors: Jeffery T. Bonk, Chesterfield, MI (US); Robert C. Fitzpatrick, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 201 days.

(21) Appl. No.: 18/235,055

(22) Filed: Aug. 17, 2023

(65) Prior Publication Data
US 2025/0058684 A1 Feb. 20, 2025

(51) Int. Cl.
*B60N 2/30* (2006.01)
*B60N 2/015* (2006.01)
*B60N 2/90* (2018.01)

(52) U.S. Cl.
CPC ....... *B60N 2/3047* (2013.01); *B60N 2/01591* (2013.01); *B60N 2/933* (2018.02); *B60N 2/90* (2018.02)

(58) Field of Classification Search
CPC .... B60N 2/01591; B60N 2/3097; B60N 3/02; B60N 3/023; B60N 2/01508; B60N 2/0292; B60N 2/3047; B60N 2/2809; B60N 2/933; B60N 2/90
USPC .................................. 297/188.11, 252, 256
See application file for complete search history.

(56) References Cited

U.S. PATENT DOCUMENTS

| | | | | |
|---|---|---|---|---|
| 5,803,543 A | * | 9/1998 | Hartmann | B60N 2/286 297/230.12 |
| 6,854,744 B2 | * | 2/2005 | Brandler | B60N 2/286 280/47.38 |
| 7,552,969 B2 | * | 6/2009 | Maciejczyk | B60R 22/105 297/484 |
| 2014/0132045 A1 | * | 5/2014 | Brady | A47C 7/624 297/188.11 |

FOREIGN PATENT DOCUMENTS

| | | | | |
|---|---|---|---|---|
| DE | 29911783 U1 | 11/2000 | | |
| DE | 10029223 C2 | * 6/2002 | ......... | B60N 2/01591 |
| JP | 05139303 A | 11/1991 | | |
| JP | 2797788 B2 | 9/1998 | | |
| JP | 2006213237 A | 8/2006 | | |

* cited by examiner

*Primary Examiner* — Milton Nelson, Jr.
(74) *Attorney, Agent, or Firm* — Barnes & Thornburg LLP (57) ABSTRACT

A vehicle includes a vehicle frame and one or more occupant supports coupled to the vehicle frame. The occupant support includes a seat bottom arranged to overlie a floor of the vehicle and a seat back coupled to the seat bottom and arranged to extend upwardly away from the floor. The vehicle includes a restraint system configured to mount the seat bottom and the seat back to at least one of the floor and the rear wall of the vehicle frame and secure a seat occupant to the rear occupant support.

17 Claims, 5 Drawing Sheets

VEHICLE AND OCCUPANT SUPPORT FOR A VEHICLE

BACKGROUND

The present disclosure relates to occupant supports, and particularly to rear occupant supports. More particularly, the present disclosure relates to a rear occupant support that is reconfigurable.

SUMMARY

According to the present disclosure, a vehicle includes a vehicle frame, a front occupant support, and a rear occupant support. The vehicle frame defines a passenger compartment and includes a floor and a rear wall. The rear occupant support is reconfigurable relative to the rest of the vehicle to provide one or more storage spaces within the passenger compartment. The rear occupant support includes a seat bottom and a seat back. The seat bottom is normally arranged generally horizontal relative to the floor in a seating position. The seat back extends upwardly from the seat bottom and the floor to provide seating surfaces for an occupant in a rear-row seating configuration.

In illustrative embodiments, the vehicle further includes a restraint system configured to secure both the rear occupant support and an occupant to the vehicle frame. The restraint system includes an upper seat retainer coupled to an upper end of the rear wall, a lower seat retainer spaced below the upper seat retainer, and an occupant harness having a vehicle seat belt coupled to the rear wall and a buckle coupled to the lower seat retainer.

In illustrative embodiments, the seat bottom and the seat back are removable from the passenger compartment as a unit and without the restraint system. The seat bottom and seat back can separate from the vehicle frame to provide a separated, rear-row storage configuration for the vehicle. Storage space between the front occupant support and the rear wall is greater in the separated, rear-row storage configuration compared to when the seat bottom and the seat back are fixed to the vehicle frame.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
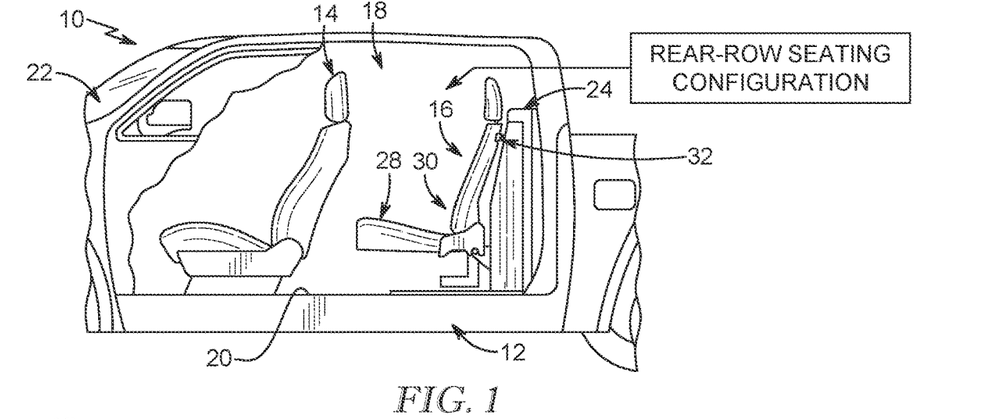
FIG. 1 is a side elevation and diagrammatic view of a portion of a vehicle with portions cut away to show that the vehicle includes a vehicle frame, a front occupant support, and a rear occupant support including a seat bottom and a seat back that cooperate to provide a seating space for an occupant when the rear occupant support is in a rear-row seating configuration, and showing that the rear occupant support further includes a restraint system that allows portions of the rear occupant support to be removed from the vehicle for extra storage space, as shown in FIG. 3.
Figure 8:
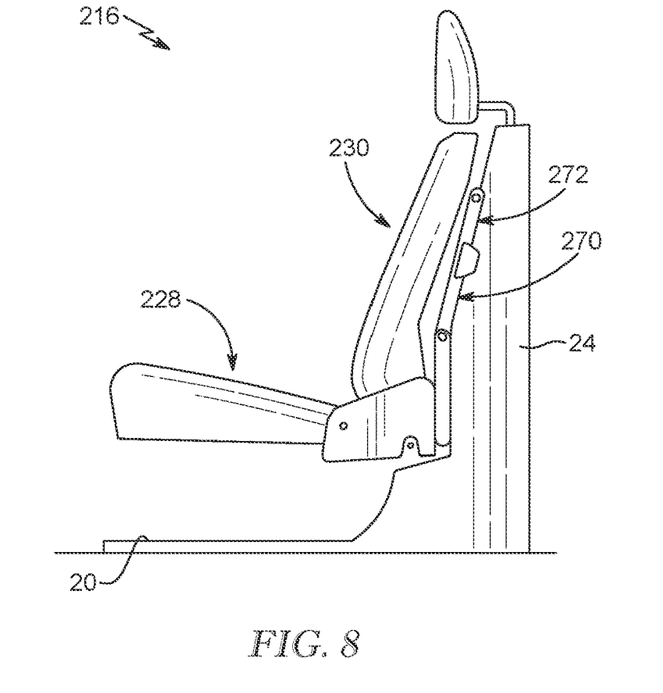
FIG. 8 is a side elevation view of another rear occupant support installed in a vehicle, the rear occupant support including a seat bottom, a seat back, and a removable stand stored in a cavity formed in a rear wall of the vehicle.
Figure 9:
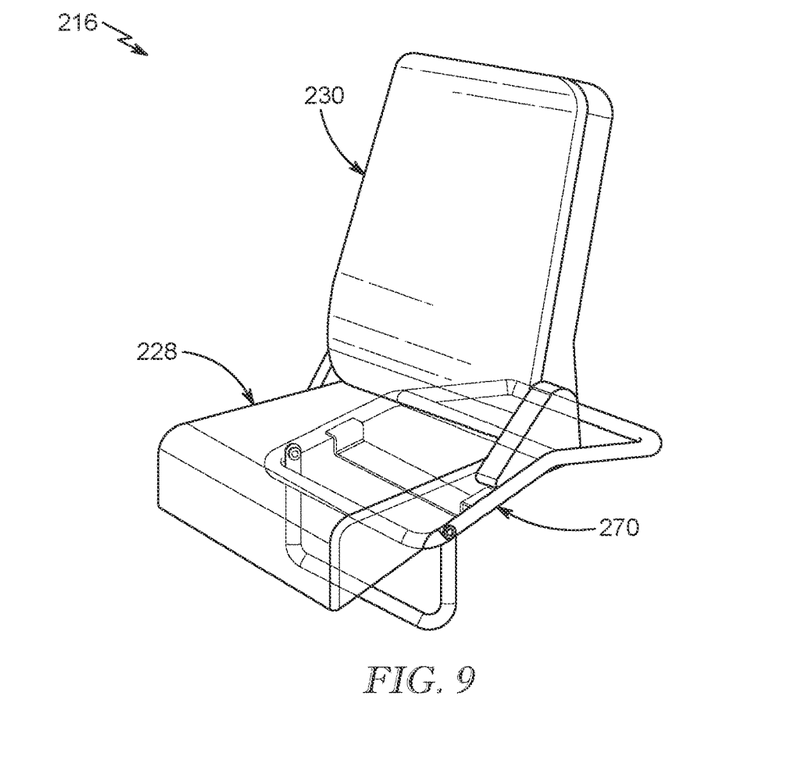
FIG. 9 is a perspective view of the rear occupant support shown in FIG. 8 showing the seat bottom and seat back removed from the vehicle and supported by the stand separate from the vehicle.

A vehicle 10, in accordance with the present disclosure, includes a vehicle frame 12, a front occupant support 14, and a rear occupant support 16, as shown in FIG. 1. The vehicle frame 12 is configured to define a passenger compartment 18 and includes a floor 20, a front dash 22 providing a front boundary of the passenger compartment 18, and a rear wall 24 providing a rear boundary of the passenger compartment 18. The front occupant support 14 is configured to support an occupant of the vehicle 10 and is positioned aft of the front dash 22. The rear occupant support 16 is also configured to support an occupant of the vehicle 10 and may be located forward of the rear wall 24 to lie between the front occupant support 14 and the rear wall 24. In some embodiments, the front occupant support 14 is a first or a second row occupant support and the rear occupant support 16 is a second or third row occupant support. Another embodiment of a rear occupant support 216 used in vehicle 10 is shown in FIGS. 8 and 9.

Figure 2:
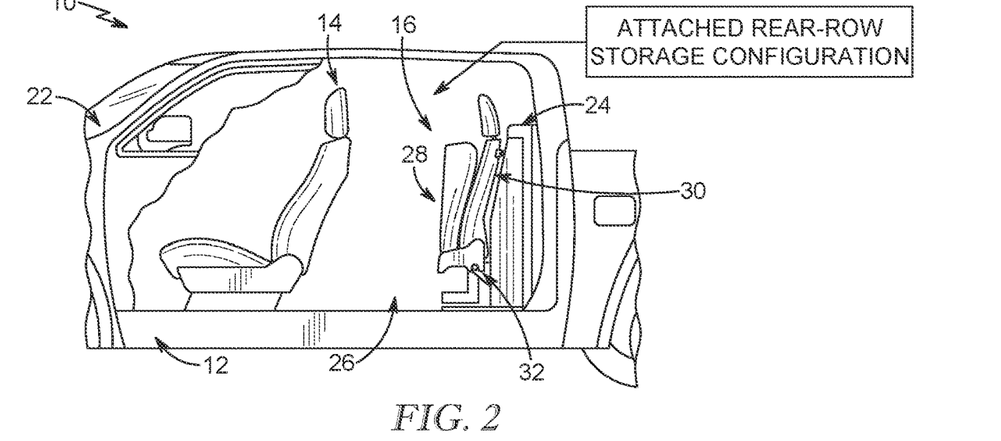
FIG. 2 is a side elevation and diagrammatic view of the portion of the vehicle shown in FIG. 1 showing that the seat bottom of the rear occupant support is pivotable to a folded position to provide a first rear-row storage space between the front occupant support and the rear occupant support.
Figure 3:
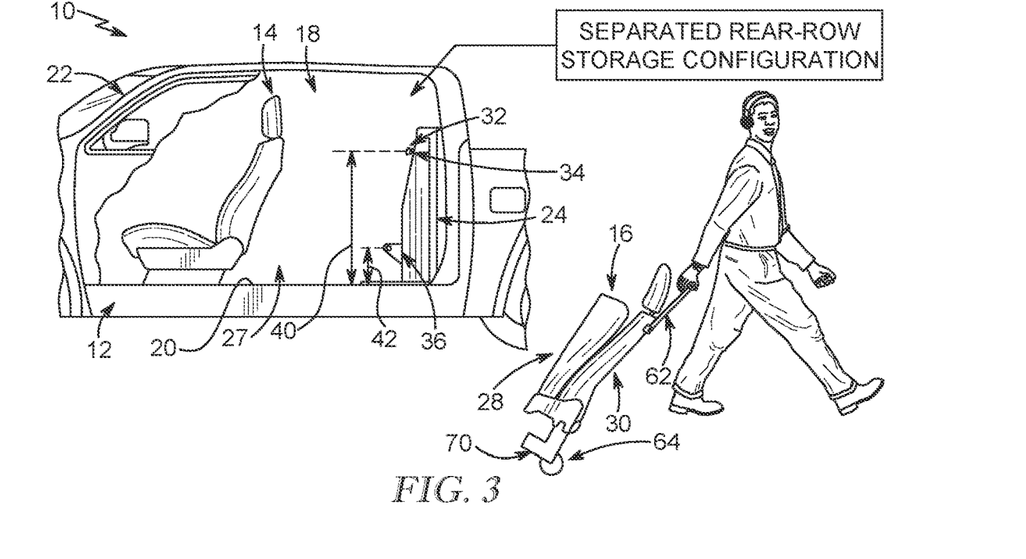
FIG. 3 is a side elevation and diagrammatic view of the portion of the vehicle shown in FIG. 1 showing the seat bottom and the seat back of the rear occupant support removed from the vehicle frame to provide a second, larger storage space between the front occupant support and a rear wall of the vehicle frame in a separated rear-row storage configuration of the vehicle.

The rear occupant support 16 is reconfigurable relative to the rest of the vehicle 10 to provide variable-sized storage spaces 26, 27 within the passenger compartment 18 of the vehicle 10 as shown in FIGS. 1-3. The rear occupant support 16 includes a seat bottom 28, a seat back 30, and a restraint system 32. The seat bottom 28 and seat back 30 provide seating surfaces for a seat occupant. The restraint system 32 is configured to mount the seat bottom 28 and the seat back 30 to at least one of the floor 20 and the rear wall 24 of the vehicle frame 12 and secure the seat occupant to the rear occupant support 16.

The restraint system 32 includes an upper seat retainer 34 fixed to the rear wall 24, a lower seat retainer 36 fixed to at least one of the floor 20 and the rear wall 24, and an occupant harness 38 configured to secure an occupant to the rear occupant support 16. The upper seat retainer 34 is spaced vertically from the floor 20 by a first distance 40 and can include one or more brackets, bars, ledges, loops, etc. that can structurally and rigidly secure the seat back 30 to the rear wall 24. The lower seat retainer 36 is spaced vertically from the floor 20 by a second distance 42 less than the first distance 40. In illustrative embodiments, the lower seat retainer 36 includes child-seat support structures such as seat anchors (i.e. ISOFIX). Thus, the lower seat retainer 36 also includes one or more brackets, bars, ledges, loops, etc. that can structurally and rigidly secure the seat back 30 and/or seat bottom 28 (and a child seat 25 supported thereon) to the rear wall 24 and/or floor 20. The occupant harness 38 includes a vehicle seat belt 44 fixed to the rear wall 24 and a seat belt buckle 46 fixed to the lower seat retainer 36 as shown in FIG. 5.

The vehicle 10 is configured to change from a rear-row seating configuration, as shown in FIG. 1, to an attached rear-row storage configuration, as shown in FIG. 2, and a separated, rear-row storage configuration as shown in FIG. 3. In the rear-row seating configuration, the rear occupant support 16 is attached to the upper seat retainer 34 and the lower seat retainer 36 and is configured to support the occupant within the passenger compartment 18. In the attached, rear-row storage configuration, the seat bottom 28 is folded against the seat back 30 to provide a first storage space 26 between the front occupant support 24 and the rear occupant support 26. When the rear occupant support 16 is attached to the vehicle frame 12, the seat bottom 28 of the rear occupant support 16 is pivotable relative to the seat back 30 from a seating position, as shown in FIG. 1, to a folded position, as shown in FIG. 2. In the seating position, the seat bottom 28 extends generally parallel to the floor 20 of the vehicle frame 12 to provide seating surfaces with the seat back 30 for the occupant when the rear occupant support 16 is in the rear-row seating configuration. In the folded position, the seat bottom 28 extends upwardly alongside the seat back 30 to provide the attached rear-row storage configuration for the vehicle 10.

In the separated, rear-row storage configuration, the rear-row occupant support 16 is removed from passenger compartment 18 to provide a second, larger storage space 27 between the front occupant support 14 and the rear wall 24. In the separated, rear-row storage configuration, the upper seat retainer 34, the lower seat retainer 36, and the occupant harness 38 remain attached to the vehicle frame 12 within the passenger compartment 18 to minimize a weight and size of the rear occupant support 16 so that installation and removal of the rear occupant support 16 from the passenger compartment 18 is easier for users.

Figure 5:
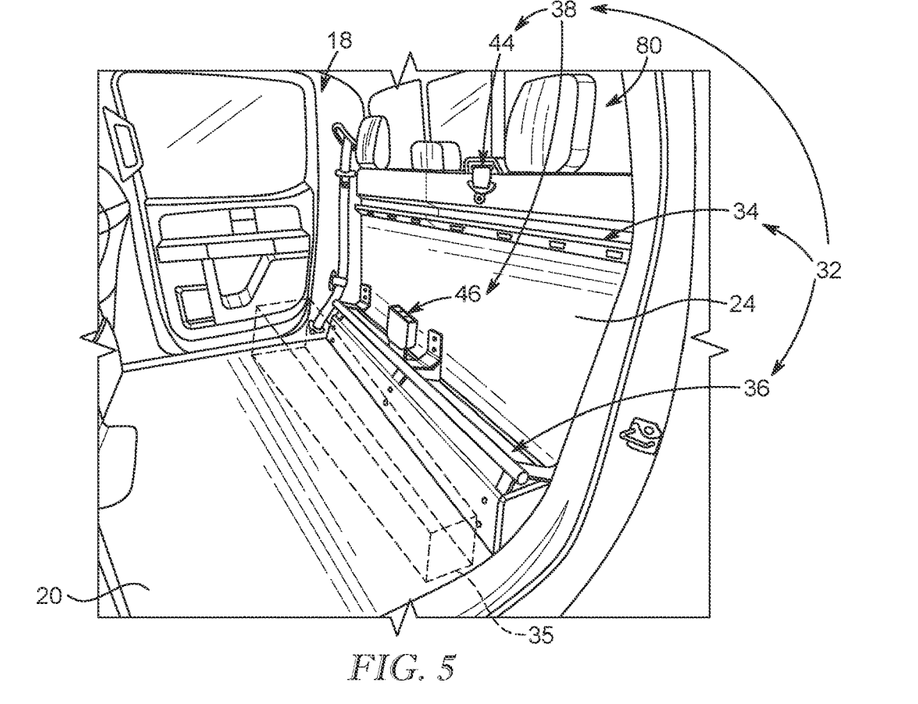
FIG. 5 is a perspective view similar to FIG. 4 showing the seat bottom and the seat back of the rear occupant support removed from the rear wall of the vehicle frame and showing that the vehicle further includes a restraint system that remains attached to the vehicle frame when the seat bottom and the seat back are removed so that a size and weight of the portions of the rear occupant support removed from the vehicle frame are minimized.

The seat retainers 34, 36, the vehicle seat belt 46, the buckle 46, and other structural components of the vehicle frame 12 that bear loads acting on each of these components are left in the passenger compartment 18 when the vehicle 10 is in the separated, rear-row storage configuration as shown in FIG. 5. This can minimize a weight and size of the portions of the occupant support 16 removed from the passenger compartment 18. This also blocks user installation errors that can result from installing components like the vehicle seat belt 44 and the buckle 46 by a person that is not trained or authorized to do so since the restraint system 32 is permanently installed on the vehicle frame 12.

In some embodiments, the restraint system 32 can be used to secure other components to the vehicle frame 12 when the vehicle 10 is in the separated, rear-row storage configuration. For example, one or more items 35 can be secured to one or both of the seat retainers 34, 36 when the seat bottom 28 and seat back 30 are removed from the passenger compartment 18. The item(s) 35 can include storage structures (i.e. shelving or racks) or straps that are used to anchor objects to the floor 20 and/or rear wall 24.

Figure 4:
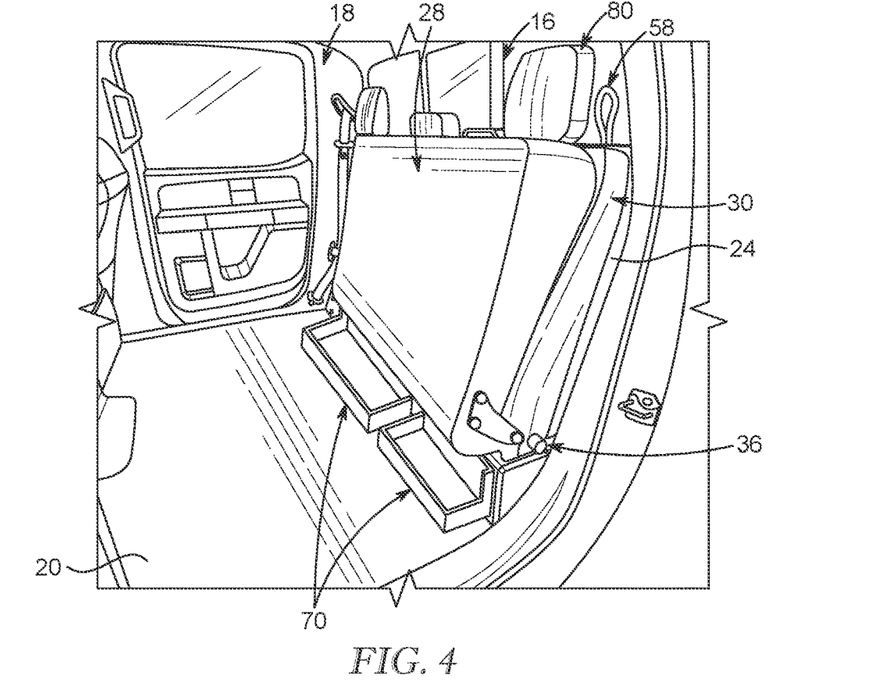
FIG. 4 is a perspective view of a portion of the vehicle showing the rear occupant support attached to the rear wall of the vehicle frame and showing the seat bottom in the folded position.

The rear occupant support 16 may further include a headrest 80 as shown in FIGS. 4 and 5. The headrest 80 is attached to an upper end of the rear wall 24. When the vehicle 10 is in the separated, rear-row storage configuration, the headrest 80 remains attached to the rear wall 24 to further minimize weight and size of the portions of the occupant support 16 removed from the passenger compartment 18.

Figure 6A:
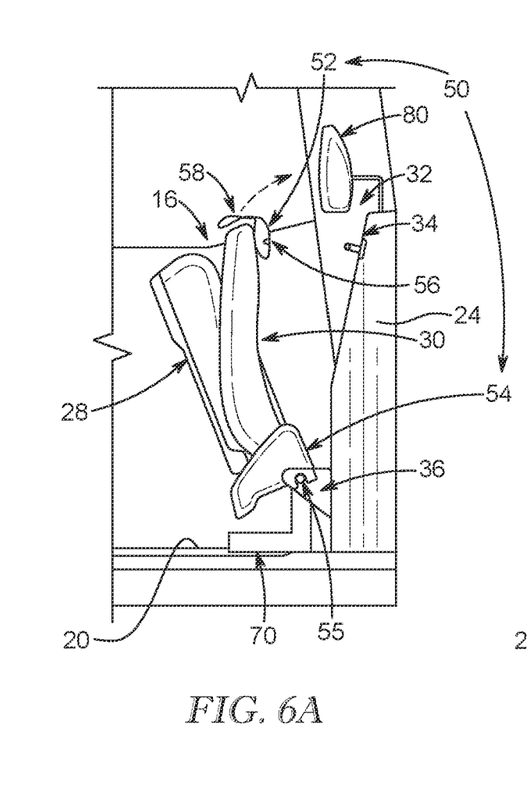
FIG. 6A is a side elevation view of the seat bottom and seat back of the rear occupant support being installed on the rear wall of the vehicle frame.
Figure 6B:
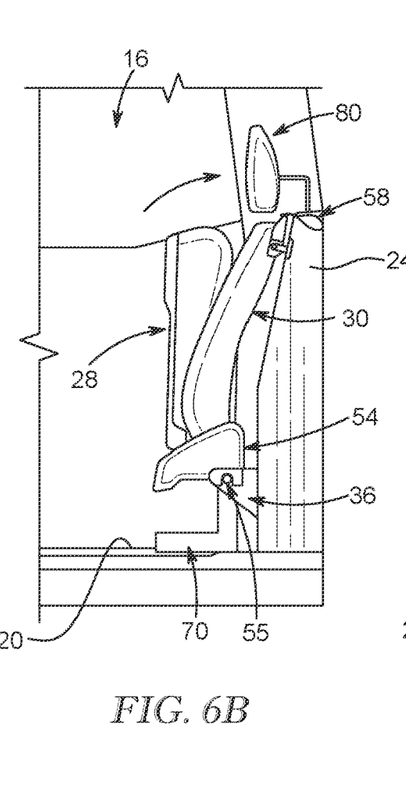
FIG. 6B is a side elevation view of the seat bottom and seat back of the rear occupant support fully installed on the rear wall of the vehicle frame and the seat bottom in the folded position.
Figure 6C:
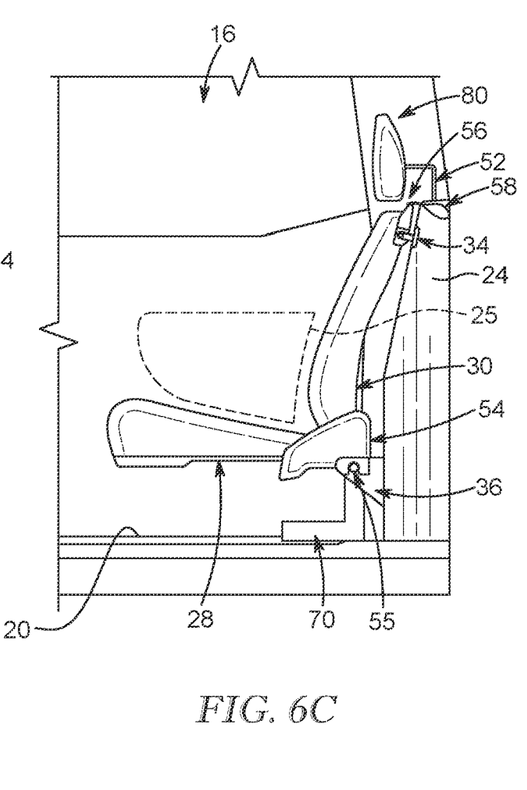
FIG. 6C is a side elevation view of the seat bottom and seat back of the rear occupant support fully installed on the rear wall of the vehicle frame and the seat bottom in the seating position.

The rear occupant support 16 further includes a seat attachment unit 50 mounted to at least one of the seat back 30 and the seat bottom 28 to latch onto the upper and lower seat retainers 34, 36 as shown in FIGS. 6A-6C. The seat attachment unit 50 includes an upper seat latch 52 coupled to an upper end of the seat back 30 and a lower seat latch 54 coupled to a lower end of the seat back 30. The upper seat latch 52 is configured to attach to the upper seat retainer 34. The lower seat latch 54 is configured to attach to the lower seat retainer 36.

The upper seat latch 52 includes a retractable latch member 56 and a latch actuator 58 coupled to the retractable latch member 56 as shown in FIGS. 6A-6C. The retractable latch member 56 can include any suitable hook, pin, bar, etc. that moves into engagement with the upper seat retainer 34 when brought into contact with the upper seat retainer 56 during installation. The latch actuator 58 is configured to be actuated by a user to move the retractable latch member between a locked position and an unlocked position. In the locked position, the retractable latch member 56 engages the upper seat retainer 34 in the rear-row seating configuration to block removal of the rear occupant support 16 from the vehicle 10. In the unlocked position, the retractable latch member 56 is separated from the upper seat retainer so that the rear occupant support 16 can be removed from the vehicle 10.

The lower seat latch 54 includes at least one hook at least partially defining a downwardly opening slot 55 as shown in FIG. 6A. At least a portion of the lower seat retainer 36 is received in the downwardly opening slot 55 when the rear occupant support 16 is in the rear-row occupant support configuration.

To uninstall the seat bottom 28 and the seat back 30 from the vehicle 10, a user can actuate the latch actuator 58 to disengage the retractable latch member 56 from the upper seat retainer 34 as suggested in FIG. 4. In the illustrative embodiment, the latch actuator 58 includes a strap that the user pulls, however, in other embodiments, the latch actuator 58 may include a button, a lever, or another suitable actuator component. Once the retractable latch member 56 is in the unlocked position, the seat bottom 28 and the seat back 30 can be pivoted in a forward direction away from the rear wall 24 about the lower seat retainer 36. Once the upper seat latch 52 is spaced apart from the upper seat retainer 34 the seat bottom 28 and the seat back can be lifted upwardly to remove the lower seat retainer 36 from the downwardly opening slot 55 and the seat bottom 28 and seat back 30 can be removed from the passenger compartment 18 as shown in FIG. 5.

To install the rear occupant support 16 in the vehicle, the lower seat latch 54 is first lowered onto the lower seat retainer 36 while the upper seat latch 52 is spaced away from the upper seat retainer 34 as shown in FIG. 6A. Once the lower seat retainer 36 is received in the downwardly opening slot 55, the seat bottom 28 and the seat back 30 are pivotable about the lower seat retainer 36 to bring the upper seat latch 54 into contact with the upper seat retainer 34 as shown in FIG. 6B. The retractable latch member 56 is configured to automatically lock onto the upper seat retainer 34 once the upper seat latch 52 is brought fully into contact with the upper seat retainer 34. The seat bottom 28 can then be pivoted away from the seat back 30 to provide the seating surface for an occupant as shown in FIG. 6C.

Figure 7:
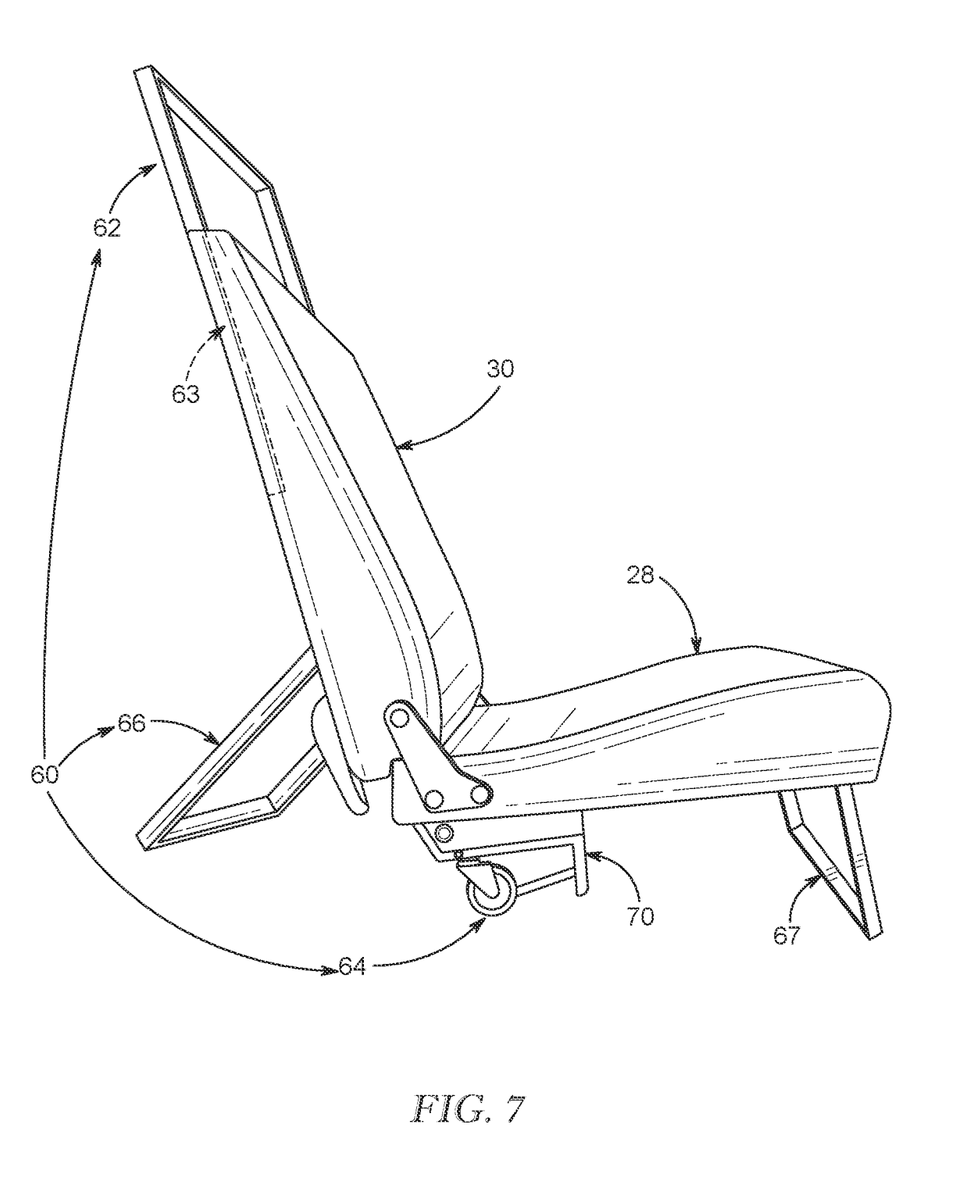
FIG. 7 is a perspective view of the seat bottom and the seat back of the rear occupant support showing that the rear occupant support further includes a transportation unit including a handle, a pair of wheels, and a pair of deployable stands configured to at least partially support the seat bottom and the seat back on ground separate from the vehicle frame.

In the illustrative embodiment, the rear occupant support 16 further includes a transportation unit 60 to facilitate transportation of the seat bottom 28 and the seat back 30 outside of the vehicle 10 as shown in FIG. 7. The transportation unit 60 includes a handle 62 coupled to the seat back 30, a pair of wheels 64 spaced apart from the handle 62, and a stand 66. The handle 62 can be extended from a space 63 formed in the seat back 30 and gripped by a user to maneuver the seat bottom 28 and the seat back 30. The wheels 64 allow the seat bottom 28 and the seat back 30 to roll over ground when the vehicle 10 is in the rear-row storage configuration. The stand 66 is configured to support the seat bottom 28 and the seat back 30 in a seating position on the ground while the vehicle 10 is in the rear-row storage configuration. In the illustrative embodiment, the occupant support 16 includes a rear stand 66 coupled to the seat back 30 and a front stand 67 coupled to the seat bottom 28. Each stand is pivotable about a respective axis from a stored position to a deployed position as shown in FIG. 7.

In the illustrative embodiment, the rear occupant support 16 further includes a storage shelf 70 coupled to a lower end of the seat bottom 28 and arranged to underlie the seat bottom 28 when the occupant support 16 is attached to the vehicle 10 and separated from the vehicle 10. The storage shelf 70 is at least partially obstructed from view and access when the rear occupant support 16 is in the seating position. The storage shelf 70 is exposed and may be accessed by a user when the seat bottom 28 is folded upwardly in the folded position as shown in FIG. 4. Each of the wheels 64 is attached to the storage shelf 70. The storage shelf 70 may partially support the seat bottom 28 and the seat back 30 in a seating position when the seat bottom 28 and the seat back 30 are separated from the vehicle frame 12.

Another embodiment of a rear occupant support 216 that can be installed and/or included in the vehicle 10 in place of the rear occupant support 16 is shown in FIGS. 8 and 9. The rear occupant support 216 includes a seat bottom 228, a seat back 230, and a removable stand 270. Like the rear occupant support 16, the seat bottom 228 and the seat back 230 of the rear occupant support 216 are removable from the vehicle 10. The stand 270 may be stored in a cavity 272 formed in the rear wall 24 or in another part of the vehicle frame 12. The seat bottom 228 and the seat back 230 can rest on the stand 270 so that the rear occupant support is usable outside of the passenger compartment 18. The stand 270 can also be attached removably to one or both of the seat bottom 228 and the seat back 230 for movement therewith.

The following numbered clauses include embodiments that are contemplated and non-limiting:

Clause 1. A vehicle includes a vehicle frame.

Clause 2. The vehicle of clause 1, any other suitable clause, or any suitable combination of clauses, wherein the vehicle frame includes a floor.

Clause 3. The vehicle of clause 2, any other suitable clause, or any suitable combination of clauses, wherein the vehicle frame includes a front dash.

Clause 4. The vehicle of clause 3, any other suitable clause, or any suitable combination of clauses, wherein the vehicle frame includes a rear wall to define a passenger compartment between the front dash and the rear wall and above the floor.

Clause 5. The vehicle of clause 4, any other suitable clause, or any suitable combination of clauses, further including a front occupant support positioned aft of the front dash within the passenger compartment.

Clause 6. The vehicle of clause 5, any other suitable clause, or any suitable combination of clauses, further including a rear occupant support located forward of the rear wall between the front occupant support and the rear wall within the passenger compartment.

Clause 7. The vehicle of clause 6, any other suitable clause, or any suitable combination of clauses, wherein the rear occupant support includes a seat bottom arranged to overlie the floor and a seat back coupled to the seat bottom and arranged to extend upwardly away from the floor in front of the rear wall.

Clause 8. The vehicle of clause 7, any other suitable clause, or any suitable combination of clauses, further including a restraint system configured to mount the seat bottom and the seat back to at least one of the floor and the rear wall of the vehicle frame and secure a seat occupant to the rear occupant support.

Clause 9. The vehicle of clause 8, any other suitable clause, or any suitable combination of clauses, wherein the restraint system includes an upper seat retainer fixed to the rear wall and spaced vertically from the floor by a first distance, a lower seat retainer fixed to at least one of the floor and the rear wall and spaced vertically from the floor by a second distance less than the first distance, and an occupant harness including a vehicle seat belt fixed to the rear wall and a seat belt buckle fixed to the lower seat retainer.

Clause 10. The vehicle of clause 9, any other suitable clause, or any suitable combination of clauses, wherein the vehicle is configured to change from a rear-row seating configuration, in which the rear occupant support is attached to the upper seat retainer and the lower seat retainer and is configured to support the occupant within the passenger compartment, to a separated, rear-row storage configuration, in which the rear-row occupant support is removed from passenger compartment while the upper seat retainer, the lower seat retainer and the occupant harness remain attached to the vehicle frame within the passenger compartment.

Clause 11. The vehicle of clause 10, any other suitable clause, or any suitable combination of clauses, wherein the seat bottom of the rear occupant support is pivotable relative to the seat back from a seating position, in which the seat bottom extends generally parallel to the floor of the vehicle frame to provide a seat surface with the seat back for the occupant when the rear occupant support is in the rear-row seating configuration, to a folded position in which the seat bottom extends upwardly alongside the seat back to provide an attached rear-row storage configuration for the vehicle.

Clause 12. The vehicle of clause 10, any other suitable clause, or any suitable combination of clauses, wherein the rear occupant support further includes a seat attachment unit including an upper seat latch coupled to the an upper end of the seat back and a lower seat latch coupled to a lower end of the seat back.

Clause 13. The vehicle of clause 12, any other suitable clause, or any suitable combination of clauses, wherein the upper seat latch includes a retractable latch member and a latch actuator coupled to the retractable latch member and configured to move the retractable latch member between a locked position engaging the upper seat retainer in the rear-row seating configuration and an unlocked position separated from the upper seat retainer.

Clause 14. The vehicle of clause 13, any other suitable clause, or any suitable combination of clauses, wherein the rear occupant support is pivotable in a forward direction away from the rear wall about the lower seat retainer when the retractable latch member is in the unlocked position.

Clause 15. The vehicle of clause 13, any other suitable clause, or any suitable combination of clauses, wherein the lower seat latch includes at least one hook at least partially defining a downwardly opening slot, and wherein the lower seat retainer is received in the downwardly opening slot when the rear occupant support is in the rear-row occupant support configuration.

Clause 16. The vehicle of clause 15, any other suitable clause, or any suitable combination of clauses, wherein the rear row occupant support is pivotable about the lower seat retainer to cause the at least one hook to pivot about the lower seat retainer while the lower seat retainer is received in the downwardly opening slot.

Clause 17. The vehicle of clause 10, any other suitable clause, or any suitable combination of clauses, wherein the rear occupant support further includes a transportation unit including a handle coupled to the seat back, a pair of wheels spaced apart from the handle to allow the rear occupant support to roll over ground when the vehicle is in the rear-row storage configuration, and a stand configured to support the occupant support in a seating position while the vehicle is in the rear-row storage configuration.

Clause 18. An occupant support for a rear row of a vehicle, the occupant support includes a seat bottom.

Clause 19. The occupant support of clause 18, any other suitable clause, or any suitable combination of clauses, further including a seat back coupled to the seat bottom and arranged to extend upwardly away from the floor in front of the rear wall.

Clause 20. The occupant support of clause 19, any other suitable clause, or any suitable combination of clauses, further including a restraint system configured to mount the seat bottom and the seat back to a frame of the vehicle and secure a seat occupant to the occupant support, the restraint system includes an upper seat retainer, a lower seat retainer, and an occupant harness including a vehicle seat belt and a seat belt buckle fixed to the lower seat retainer.

Clause 21. The occupant support of clause 20, any other suitable clause, or any suitable combination of clauses, wherein the restraint system is configured to be permanently fixed to the frame of the vehicle and the seat bottom and the seat back are removable from the restraint system to be separated from the vehicle and the restraint system to provide a storage configuration for the vehicle.

Clause 22. The occupant support of clause 21, any other suitable clause, or any suitable combination of clauses, wherein the seat bottom is pivotable relative to the seat back from a seating position, in which the seat bottom extends away from the seat back to provide a seat surface with the seat back for an occupant, to a folded position in which the seat bottom extends upwardly alongside the seat back to provide an attached rear-row storage configuration.

Clause 23. The occupant support of clause 21, any other suitable clause, or any suitable combination of clauses, wherein the occupant support further includes a transportation unit including a handle coupled to the seat back, a pair of wheels spaced apart from the handle to allow the occupant support to roll over ground, and a stand configured to support the occupant support in a seating position while the occupant support is separated from the vehicle.

Clause 24. The occupant support of clause 20, any other suitable clause, or any suitable combination of clauses, wherein the seat back of the rear row occupant support is formed to include a handle-receiving space and the handle is extendable from the handle-receiving space to a use position to roll the occupant support over ground.

Clause 25. The occupant support of clause 20, any other suitable clause, or any suitable combination of clauses, further comprising a storage shelf coupled to a lower end of the seat bottom and arranged to underlie the seat bottom when the occupant support is attached to the vehicle and separated from the vehicle.

Clause 26. The occupant support of clause 21, any other suitable clause, or any suitable combination of clauses, wherein the occupant support further includes a seat attachment unit including an upper seat latch coupled to the an upper end of the seat back and a lower seat latch coupled to a lower end of the seat back.

Clause 27. The occupant support of clause 26, any other suitable clause, or any suitable combination of clauses, wherein the upper seat latch includes a retractable latch member and a latch actuator coupled to the retractable latch member and configured to move the retractable latch member between a locked position engaging the upper seat retainer and an unlocked position separated from the upper seat retainer so that the occupant support can be removed from the vehicle.

Clause 28. The occupant support of clause 27, any other suitable clause, or any suitable combination of clauses, wherein the lower seat latch includes at least one hook at least partially defining a downwardly opening slot, and wherein the lower seat retainer is received in the downwardly opening slot when the occupant support is attached to the vehicle.

Clause 29. An occupant support for a rear row of a vehicle, the occupant support comprising a seat bottom, and a seat back coupled to the seat bottom and arranged to extend upwardly away from the floor in front of the rear wall.

Clause 30. The occupant support of clause 29, any other suitable clause, or any suitable combination of clauses, further including a transportation unit including a handle coupled to the seat back, a pair of wheels spaced apart from the handle to allow the seat bottom and the seat back to roll over ground, and a stand configured to support the occupant support in a seating position without being attached to the vehicle.

Clause 31. The occupant support of clause 30, any other suitable clause, or any suitable combination of clauses, wherein the seat back of the rear row occupant support is formed to include a handle-receiving space and the handle is extendable from the handle-receiving space to a use position to roll the occupant support over ground.

Clause 32. The occupant support of clause 31, any other suitable clause, or any suitable combination of clauses, further comprising a storage shelf coupled to a lower end of the seat bottom and arranged to underlie the seat bottom when the occupant support is attached to the vehicle and separated from the vehicle.

Clause 33. The occupant support of clause 32, any other suitable clause, or any suitable combination of clauses, further comprising a restraint system configured to mount the seat bottom and the seat back to a frame of the vehicle and secure a seat occupant to the occupant support, the restraint system includes an upper seat retainer, a lower seat retainer, and an occupant harness including a vehicle seat belt and a seat belt buckle fixed to the lower seat retainer.

Clause 34. The occupant support of clause 33, any other suitable clause, or any suitable combination of clauses, wherein the restraint system is configured to be permanently fixed to the frame of the vehicle and the seat bottom and the seat back are removable from the restraint system to be separated from the vehicle and the restraint system to provide a storage configuration for the vehicle.

The invention claimed is:

1. A vehicle comprising
a vehicle frame including a floor, a front dash, and a rear wall to define a passenger compartment between the front dash and the rear wall and above the floor,
a front occupant support positioned aft of the front dash within the passenger compartment, and
a rear occupant support located forward of the rear wall between the front occupant support and the rear wall within the passenger compartment, the rear occupant support including a seat bottom arranged to overlie the floor, a seat back coupled to the seat bottom and arranged to extend upwardly away from the floor in front of the rear wall, and a restraint system configured to mount the seat bottom and the seat back to at least one of the floor and the rear wall of the vehicle frame and secure a seat occupant to the rear occupant support,
wherein the restraint system includes an upper seat retainer fixed to the rear wall and spaced vertically from the floor by a first distance, a lower seat retainer fixed to at least one of the floor and the rear wall and spaced vertically from the floor by a second distance less than the first distance, and an occupant harness including a vehicle seat belt fixed to the rear wall and a seat belt buckle fixed to the lower seat retainer, and
wherein the vehicle is configured to change from a rear-row seating configuration, in which the rear occupant support is attached to the upper seat retainer and the lower seat retainer and is configured to support the occupant within the passenger compartment, to a separated, rear-row storage configuration, in which the rear-row occupant support is removed from passenger compartment while the upper seat retainer, the lower seat retainer and the occupant harness remain attached to the vehicle frame within the passenger compartment.

2. The vehicle of claim 1, wherein the seat bottom of the rear occupant support is pivotable relative to the seat back from a seating position, in which the seat bottom extends generally parallel to the floor of the vehicle frame to provide a seat surface with the seat back for the occupant when the rear occupant support is in the rear-row seating configuration, to a folded position in which the seat bottom extends upwardly alongside the seat back to provide an attached rear-row storage configuration for the vehicle.

3. The vehicle of claim 1, wherein the rear occupant support further includes a seat attachment unit including an upper seat latch coupled to the an upper end of the seat back and a lower seat latch coupled to a lower end of the seat back.

4. The vehicle of claim 3, wherein the upper seat latch includes a retractable latch member and a latch actuator coupled to the retractable latch member and configured to move the retractable latch member between a locked position engaging the upper seat retainer in the rear-row seating configuration and an unlocked position separated from the upper seat retainer.

5. The vehicle of claim 4, wherein the rear occupant support is pivotable in a forward direction away from the rear wall about the lower seat retainer when the retractable latch member is in the unlocked position.

6. The vehicle of claim 4, wherein the lower seat latch includes at least one hook at least partially defining a downwardly opening slot, and wherein the lower seat retainer is received in the downwardly opening slot when the rear occupant support is in the rear-row occupant support configuration.

7. The vehicle of claim 6, wherein the rear row occupant support is pivotable about the lower seat retainer to cause the at least one hook to pivot about the lower seat retainer while the lower seat retainer is received in the downwardly opening slot.

8. The vehicle of claim 1, wherein the rear occupant support further includes a transportation unit including a handle coupled to the seat back, a pair of wheels spaced apart from the handle to allow the rear occupant support to roll over ground when the vehicle is in the rear-row storage configuration, and a stand configured to support the occupant support in a seating position while the vehicle is in the rear-row storage configuration.

9. An occupant support for a rear row of a vehicle, the occupant support comprising
a seat bottom,
a seat back coupled to the seat bottom, and
a restraint system configured to mount the seat bottom and the seat back to a frame of the vehicle and secure a seat occupant to the occupant support, the restraint system includes an upper seat retainer, a lower seat retainer, and an occupant harness including a vehicle seat belt and a seat belt buckle fixed to the lower seat retainer,
wherein the restraint system is configured to be permanently fixed to the frame of the vehicle and the seat bottom and the seat back are removable from the restraint system to be separated from the vehicle and the restraint system to provide a storage configuration for the vehicle,
wherein the occupant support further includes a seat attachment unit including an upper seat latch coupled to an upper end of the seat back and a lower seat latch coupled to a lower end of the seat back,
wherein the upper seat latch includes a retractable latch member and a latch actuator coupled to the retractable latch member and configured to move the retractable latch member between a locked position engaging the upper seat retainer and an unlocked position separated from the upper seat retainer so that the occupant support can be removed from the vehicle, and wherein the lower seat latch includes at least one hook at least partially defining a downwardly opening slot, and wherein the lower seat retainer is received in the downwardly opening slot when the occupant support is attached to the vehicle.

10. The occupant support of claim 9, wherein the seat bottom is pivotable relative to the seat back from a seating position, in which the seat bottom extends away from the seat back to provide a seat surface with the seat back for an occupant, to a folded position in which the seat bottom extends upwardly alongside the seat back to provide an attached rear-row storage configuration.

11. The occupant support of claim 9, wherein the occupant support further includes a transportation unit including a handle coupled to the seat back, a pair of wheels spaced apart from the handle to allow the occupant support to roll over ground, and a stand configured to support the occupant support in a seating position while the occupant support is separated from the vehicle.

12. The occupant support of claim 9, wherein the seat back of the rear row occupant support is formed to include a handle-receiving space and the handle is extendable from the handle-receiving space to a use position to roll the occupant support over ground.

13. The occupant support of claim 12, further comprising a storage shelf coupled to a lower end of the seat bottom and arranged to underlie the seat bottom when the occupant support is attached to the vehicle and separated from the vehicle.

14. An occupant support for a rear row of a vehicle, the occupant support comprising a seat bottom, a seat back coupled to the seat bottom and including a backrest and a headrest, and a transportation unit including a handle coupled to the seat back, a pair of wheels spaced apart from the handle to allow the seat bottom and the backrest to roll over ground, and a stand configured to support the occupant support in a seating position without being attached to the vehicle, wherein the seat bottom, the backrest, and the transportation unit are separable from the vehicle while the headrest remains attached to the vehicle so that the transportation system can be used to roll over ground and support the occupant support in the seating position without the headrest.

15. The occupant support of claim 14, wherein the backrest of the rear row occupant support is formed to include a handle-receiving space and the handle is extendable from the handle-receiving space to a use position to roll the occupant support over ground.

16. The occupant support of claim 15, further comprising a storage shelf coupled to a lower end of the seat bottom and arranged to underlie the seat bottom when the occupant support is attached to the vehicle and separated from the vehicle.

17. The occupant support of claim 16, further comprising a restraint system configured to mount the seat bottom and the seat back to a frame of the vehicle and secure a seat occupant to the occupant support, the restraint system includes an upper seat retainer, a lower seat retainer, and an occupant harness including a vehicle seat belt and a seat belt buckle fixed to the lower seat retainer, and wherein the restraint system is configured to be permanently fixed to the frame of the vehicle and the seat bottom and the backrest are removable from the restraint system to be separated from the vehicle and the restraint system to provide a storage configuration for the vehicle.

\* \* \* \* \*